US011549330B2

(12) United States Patent
Cook et al.

(10) Patent No.: US 11,549,330 B2
(45) Date of Patent: Jan. 10, 2023

(54) PLUG-AND-PLAY, PRE-PACKAGED, AND PURPOSE BUILT VALVE BLOCK

(71) Applicant: FMC Technologies, Inc., Houston, TX (US)

(72) Inventors: James Cook, Houston, TX (US); Gareth Boyd, Houston, TX (US); Julian Keihany, Houston, TX (US); Thiago Machado, Houston, TX (US)

(73) Assignee: FMC TECHNOLOGIES, INC., Houston, TX (US)

( * ) Notice: Subject to any disclaimer, the term of this patent is extended or adjusted under 35 U.S.C. 154(b) by 100 days.

(21) Appl. No.: 16/744,971

(22) Filed: Jan. 16, 2020

(65) Prior Publication Data

US 2021/0222514 A1    Jul. 22, 2021

(51) Int. Cl.
*E21B 34/02* (2006.01)
*G01M 13/003* (2019.01)
*F16K 27/00* (2006.01)

(52) U.S. Cl.
CPC .......... *E21B 34/02* (2013.01); *F16K 27/003* (2013.01); *G01M 13/003* (2019.01)

(58) Field of Classification Search
USPC .......................................... 251/1.1, 1.2, 1.3
See application file for complete search history.

(56) References Cited

U.S. PATENT DOCUMENTS

| | | | | |
|---|---|---|---|---|
| 10,132,146 | B2* | 11/2018 | Guidry | E21B 19/00 |
| 2017/0285668 | A1* | 10/2017 | Moseley | G05D 16/2093 |
| 2018/0283618 | A1* | 10/2018 | Cook | E21B 43/26 |
| 2018/0284816 | A1 | 10/2018 | Cook et al. | |
| 2018/0284817 | A1* | 10/2018 | Cook | E21B 43/26 |
| 2019/0153803 | A1 | 5/2019 | Cook | |

OTHER PUBLICATIONS

International Search Report issued in International Application No. PCT/US2021/013241 dated Apr. 29, 2021 (5 pages).
Written Opinion issued in International Application No. PCT/US2021/013241 dated Apr. 29, 2021 (9 pages).
International Preliminary Report on Patentability issued in International Application No. PCT/US2021/013241 dated Jul. 19, 2022 (8 pages).

* cited by examiner

*Primary Examiner* — Daphne M Barry
(74) *Attorney, Agent, or Firm* — Osha Bergman Watanabe & Burton LLP (57) ABSTRACT

A valve block may be assembled, in a controlled environment, a valve block to be modular and purpose built for a specific application. The specific application may be an operation to be performed at a well site. The modular purpose built valve block may be function tested, in the controlled environment. Additionally, the modular purpose built valve block may be pre-packaged, in the controlled environment, to have a digital system to operate and automate the modular purpose built valve block. Further, the modular pre-packaged purpose built valve block may be deployed to the well site, and the modular pre-packaged purpose built valve block may be fluidly coupled to a wellhead. The modular pre-packaged purpose built valve block may be operated to perform the operation at the well site.

20 Claims, 8 Drawing Sheets

PLUG-AND-PLAY, PRE-PACKAGED, AND PURPOSE BUILT VALVE BLOCK

FIELD OF THE DISCLOSURE

Embodiments disclosed herein relate generally to oil and gas production equipment. More particularly, embodiments disclosed herein relate to a plug-and-play, pre-packaged, purpose built valve block.

BACKGROUND

A wide variety of hydraulic fracturing equipment is used in oil and natural gas fields such as a slurry blender, one or more high-pressure, high-volume fracturing pumps and a monitoring unit. Additionally, associated equipment includes fracturing tanks, one or more units for storage and handling of proppant, high-pressure treating iron, a chemical additive unit (used to accurately monitor chemical addition), low-pressure flexible hoses, and many gauges and meters for flow rate, fluid density, and treating pressure. Fracturing equipment operates over a range of pressures and injection rates, and can reach up to 100 megapascals (15,000 psi) and 265 litres per second (9.4 cu ft/s) (100 barrels per minute). Additionally, production and fracturing equipment is often connected to wellheads used for the extraction of hydrocarbons from subterranean/subsea formations. Production equipment connected to a wellhead may include a production Christmas tree connected to the upper end of the wellhead housing. The Christmas tree controls and distributes the fluids produced from the wellbore. Valves are typically provided within Christmas trees for controlling the flow of oil or gas from a wellhead and/or for controlling circulating fluid flow in and out of a wellbore. The Christmas tree may control the flow of the hydrocarbons to production equipment disposed at a distance from the wellhead, such as a flowline hub. Similarly, frac trees may be used to control the flow of fluids into and from the wellbore during fracturing operations.

Figure 1:
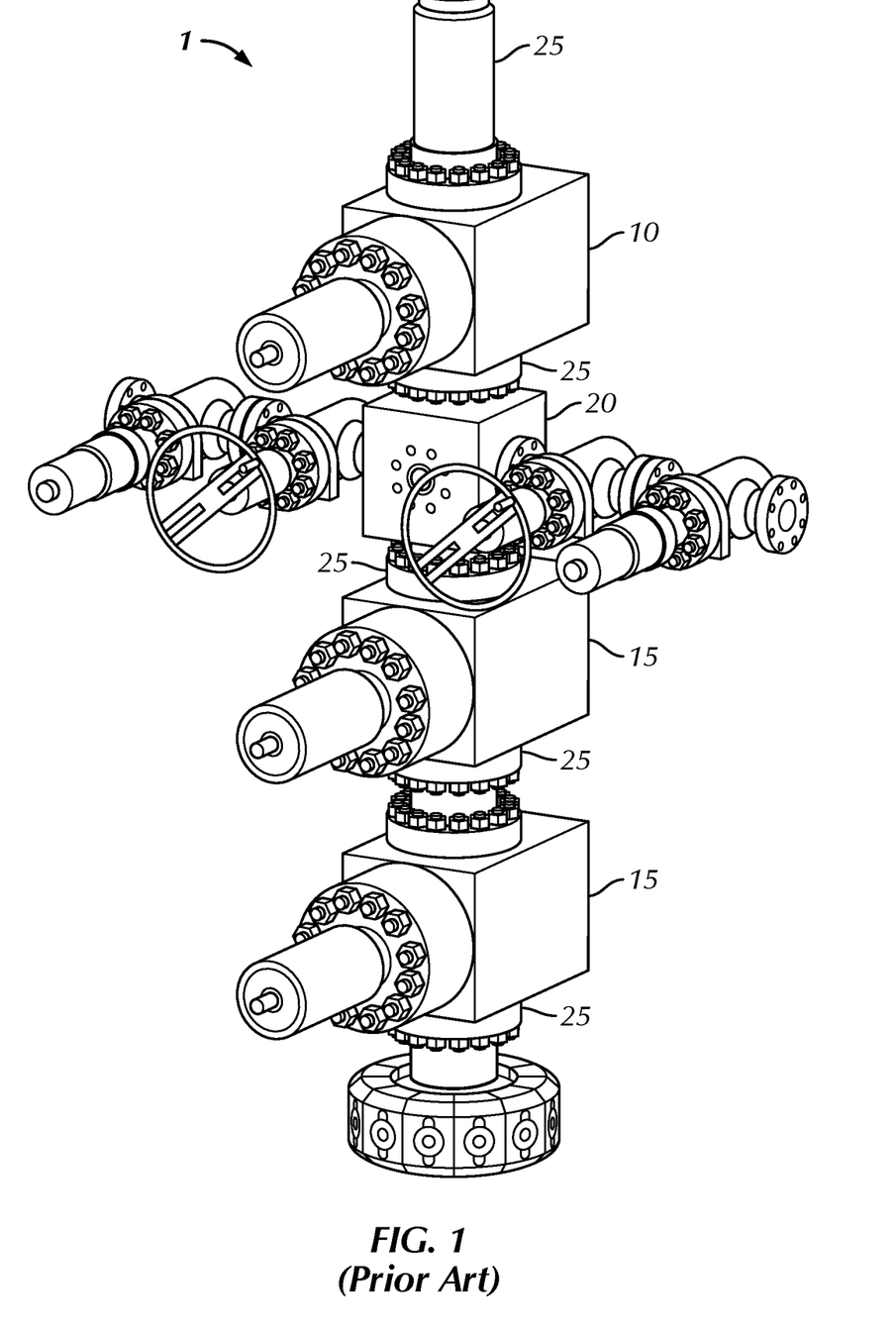
FIG. 1 is a perspective view of a prior art Christmas tree assembly.

Conventional trees comprise an assembly of valves and piping components. For example, as shown in FIG. 1, a tree 1 may include one or more swab valves 10, one or more main valves 15, and one or more cross blocks 20 (cross-flow piping components). Each valve and piping component is provided as a separate piece, to be attached to the pieces disposed above and below it via flanged piping spools 25. A typical spool piece 25 may include six, eight, or more bolts per flange connecting adjacent valves or blocks. To assemble, perform maintenance, or otherwise access the components, each bolt may have to be torqued, and each connection may have to be tested whenever a tree is assembled or reassembled, which may require significant time, personnel, equipment, and cost. The spool pieces additionally increase the overall height of the tree.

Composite trees represent an alternative to the conventional trees as shown in FIG. 1. Composite trees may include a single body of material in which all of the necessary valves and cross-flow components are formed. Composite trees require significantly less assembly time than conventional trees. However, composite trees are difficult and time-consuming to repair, as individual components cannot be removed therefrom. In other words, it is not possible to replace one piece of a composite tree because all of the pieces are formed within or as a single body. Additionally, in convention methods, a frac and drill out tree are one in the same. By having the frac and drill out tree combined, the tree is tied up for long periods of time, even though their actual utilization on site may be low.

SUMMARY OF THE DISCLOSURE

Embodiments herein are directed toward valve block structures and systems which allow for quick assembly and reassembly, while also permitting replacement of parts.

This summary is provided to introduce a selection of concepts that are further described below in the detailed description. This summary is not intended to identify key or essential features of the claimed subject matter, nor is it intended to be used as an aid in limiting the scope of the claimed subject matter.

In contrast to the standard valve blocks as described above, embodiments herein make each segment of a valve block (e.g., valves and flow crosses) into its own modular block. The valve blocks may then be stacked and coupled together at once, rather than using spools and bolted flanges between each of the segments, as is done now. One of the primary benefits of configurations according to embodiments herein is that it reduces the height of the valve block, so that it fits within DOT regulations for standard transportation to the wellsite. Further, a pre-packaged valve block structure may be assembled according to embodiments herein, where the upper master valve (UMV), flow cross, and swab valve are connected and shipped as a unit to the field for installation. In some embodiments, a quick connector hub may be located below the UMV to attach to the lower master valve (LMV) in place at the wellhead.

Additionally, embodiments herein may make the valve block pre-packaged prior to shipment to a well site. By pre-packaging the valve block, the valve block may be function tested in a controlled environment (i.e., a work shop) to validate functionality and pressure integrity prior to shipping to the well site. Testing in the shop may allow a user to validate an integration of the valve block into a digital platform that may be controlled in the field. One skilled in the art will appreciate how a control system that tests in the shop may be the same control system used in the well site, which may ensure the control system of the valve block will work when installed at the well site.

The pre-packaged valve block may additionally allow an opportunity to completely automate the entire testing process without any human intervention outside of initial setup. A user may start the test, and the system will pressure test and function test every valve on the pre-packaged valve block without any intervention into the test cell. By having no intervention in the test, throughput may be improved and have more available manpower in the shop. In addition, the pre-packaged valve block may be deployed as a purpose built block, rather than as an all-in-one tree. The pre-packaged purpose built valve block may improve performance specific to one type of operation, and allow for swap out for other pre-packaged purpose built valve blocks that may be better suited for a different application or operation.

In one aspect, embodiments herein relate to a method. The method may include assembling, in a controlled environment, a valve block to be modular and purpose built for a specific application, wherein the specific application is an operation to be performed at a well site; function testing, in the controlled environment, the modular purpose built valve block; pre-packaging, in the controlled environment, the modular purpose built valve block to have a digital system to operate and automate the modular purpose built valve block; deploying the modular pre-packaged purpose built valve block to the well site, wherein the modular pre-packaged purpose built valve block is fluidly coupled to a wellhead; and operating the modular pre-packaged purpose built valve block to perform the operation at the well site.

In another aspect, embodiments herein relate to a system that may include a valve block with a continuous flow path in at least one or more blocks. The one or more block may be configured to connect to a wellhead, or pump fluids into a wellbore, or provide power to other equipment, or bleed off and discharge pressure, or isolate various flow paths. Additionally, a control wrap system, with one or more control blocks, may be coupled to at least one of the one or more blocks. The control wrap system may be a digital system to operate and automate the valve block.

In yet another aspect, embodiments herein relate to a method. The method may include receiving an order for one or more valve blocks to perform a specific application, wherein the specific application is an operation to be performed at a well site; building the one or more valve blocks in a controlled environment, wherein the building may include assembling the one or more valve blocks to be modular and purpose built for the specific application, function testing the one or more modular purpose built valve blocks to perform the specific application, and programing the one or more modular purpose built valve blocks to have a digital system to operate and automate the one or more modular purpose built valve blocks; and shipping the one or more modular pre-packaged purpose built valve blocks to the well site.

Other aspects and advantages will be apparent from the following description and the appended claims.

BRIEF DESCRIPTION OF DRAWINGS

FIGS. 2A-3B are perspective views of modular pre-packaged purpose built valve block assemblies according to embodiments herein.

DETAILED DESCRIPTION

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Further, embodiments disclosed herein are described with terms designating a valve block reference to a block with at least one bore that may be used to control and regulate the flow of fluids for purposes of either injecting fluid (such as a frac fluid) into an injection well or recovering hydrocarbons (such as reservoir fluids, oil, and/or gas) from a production well. In addition, any terms designating valve block (i.e., any wellheads or frac valves) at a rig type (i.e., any land rig or offshore rig) should not be deemed to limit the scope of the disclosure. As used herein, fluids may refer to slurries, liquids, gases, and/or mixtures thereof. It is to be further understood that the various embodiments described herein may be used in various stages of a well, such as rig site preparation, drilling, completion, abandonment etc., and in other environments, such as work-over rigs, fracking installation, well-testing installation, oil and gas production installation, without departing from the scope of the present disclosure. It is recognized by the different embodiments described herein that a valve block plays a valuable and useful role in the life of a well. Further, it is recognized that the fluid flow configuration and arrangement of components for a valve block according to one or more embodiments described herein may provide a cost effective alternative to conventional valve block. The embodiments are described merely as examples of useful applications, which are not limited to any specific details of the embodiments herein.

As used herein, the term "coupled" or "coupled to," "connected" or "connected to," and "attached" or "attached to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Embodiments herein are generally directed toward a valve block, such as blocks with one or more fluid conduits and valves that may to direct fluid produced from or injected into a well for producing oil and gas. In some embodiments, the valve block may be a Christmas tree or a frac tree. In a non-limiting example, the valve blocks may include two or more blocks, including valve blocks, flow blocks, or combinations thereof, compactly fluidly connected using seat pocket inserts fluidly connecting the blocks and sealing the inter-block flow bores and seat pockets so as to retain fluids within the flow passages of the blocks. Additionally, the valve blocks may include a control wrap system coupled to the two or more blocks to control and operate the valve blocks. It is further envisioned that the valve block may refer to a body, disposed on a skid or trailer, having a continuous flow path formed therethrough with connection ends for various purposes such as connecting to a wellhead, pumping injection fluids into a wellbore, providing power to other equipment, bleeding off and discharging pressure, and isolating various flow paths from each other. In some embodiments, the valve block may be operationally coupled to a hydraulic fracturing system.

In one or more embodiments, a valve block may be modular, pre-packaged, and purpose built (reference numeral 50 in FIGS. 2A-4D). The modular pre-packaged purpose built valve block 50 may improve logistics and deployment of multiple complex features and functionality by pre-packaging equipment thereon prior to shipment to the field. In a non-liming example, the equipment on the modular pre-packaged purpose built valve block may be, but not limited to, one or more of an automation package, hydraulic actuation controls, grease distribution and automation, pressure transducer, valve position sensors, vibration monitoring, and digital asset identification. It is further envisioned that a plug-and-play feature may be provided to allow a user to connect inputs (i.e., air, hydraulics, electronic signal, etc.) into the modular pre-packaged purpose built valve block. The inputs may turn the modular pre-packaged purpose built valve block live and ready to use. Additionally, a digital system may be provided to recognize and identify the modular pre-packaged purpose built valve block, such as what features or equipment is within the modular pre-packaged purpose built valve block. Further, the digital system may allow a user to control the modular pre-packaged purpose built valve block remotely.

A modular pre-packaged purpose built valve block according to embodiments herein may include two or more blocks. The two or more blocks may include, for example, a first block having a flow bore or passage therethrough, including an inlet and an outlet end, as well as a second block having a flow bore or passage therethrough, including an inlet and an outlet end. The two or more blocks may also include cross-bores, such as for insertion of valve elements or to connect to additional flow components. It is further envisioned that that the two or more blocks may be integrated together to form one single body piece with a continuous flow path.

The inlet and outlet ends of the flow bores through the blocks may include seat pockets. The seat pockets may be configured to receive a seat pocket insert, which may include one or more sealing elements A seat pocket insert may be partially disposed within each of a first block and a second block, and the seat pocket insert may include a throughbore fluidly connecting the first block outlet to the second block inlet, for example. The blocks of the modular pre-packaged purpose built valve block may thus be fluidly connected using inter-block seat pocket inserts, where respective portions of the seat pocket insert may be disposed within a first block and a second block. The sealing elements may be configured to seal external surfaces of the seat pocket against an internal surface of the respective flow passage of the one or more blocks. Depending on size, pressure rating and style, a seal (e.g., elastomer or metal) may be included to sealingly attach a seat seal or valve seal to the seat pocket insert. For example, the seat pocket insert may be used in an inlet or outlet of a valve block, such as a gate valve, and a profile of the seat pocket insert may be sealingly coupled to a seat seal sealingly engaged with the gate of the valve. The seat seal may abut against a profile (seat pocket) of the seat pocket insert.

The modular pre-packaged purpose built valve block may also include a retention system. The retention system may be configured to retain the two or more blocks in position and compress and engage one or more of the sealing elements. The retention system may include, for example, one or more threaded posts extending through the two or more blocks, and each of the two or more blocks comprises one or more through-holes to receive the threaded posts; nuts or other means may be tightened (torqued) to compress and engage one or more of the sealing elements. In other embodiments, the retention system may include one or more strength arms, and each of the two or more blocks may include one or more notches configured to engage the strength arms; compression of the blocks during attachment of the strength arms may compress and engage one or more sealing elements.

In some embodiments, for example, a modular pre-packaged purpose built valve block according to embodiments herein may include a first gate valve block. A second gate valve block may be disposed adjacent to and fluidly connected to the first gate valve block. A cross flow block may be disposed adjacent to and fluidly connected to the second gate valve block. Further, a third gate valve block may be disposed adjacent to and fluidly connected to the cross flow block. A first seat pocket insert may be sealingly disposed within a seat pocket of the first gate valve block and a seat pocket of the second gate valve block, and the first seat pocket insert may include a fluid passage to provide the fluid connection between the first and second gate valve blocks. A second seat pocket insert may be sealingly disposed within a seat pocket of the second gate valve block and a seat pocket of the cross flow block, and the second seat pocket insert may include a fluid passage to provide the fluid connection between the second gate valve block and the cross flow block. A third seat pocket insert may be sealingly disposed within another seat pocket of the cross flow block and a seat pocket of the third gate valve block, where the third seat pocket insert may include a fluid passage to provide the fluid connection between the cross flow block and the third gate valve block. The modular valve block may also include a retention system configured to retain each of the blocks in position and compress and engage one or more sealing elements of the first seat pocket insert, the second seat pocket insert, and the third seat pocket insert.

Modular pre-packaged purpose built valve blocks may, of course, have alternative arrangements. In various embodiments, some blocks may include a greater or fewer number of valve blocks or a greater or fewer number of cross flow blocks. Further, the valve blocks and cross flow blocks may be arranged in any order or configuration. For example, in some embodiments, the modular pre-packaged purpose built valve block may include a lower master valve block and an upper master valve block. In other embodiments, the valve block may include an upper master valve block configured to attach to a lower master valve block already present at a well site. In some embodiments, a modular pre-packaged purpose built valve block may include multiple blocks or a single block arranged vertically, horizontally, or a combination. The block assembly may include one or more mater valve blocks disposed downstream or upstream a cross flow block and one or more swab valve blocks disposed downstream or upstream the cross flow block. The lowermost master valve block may be configured to connect to a wellsite, and the uppermost swab valve block may be configured to connect to an adapter to connect to a downstream or upstream component or a blind flange.

Figure 2A:
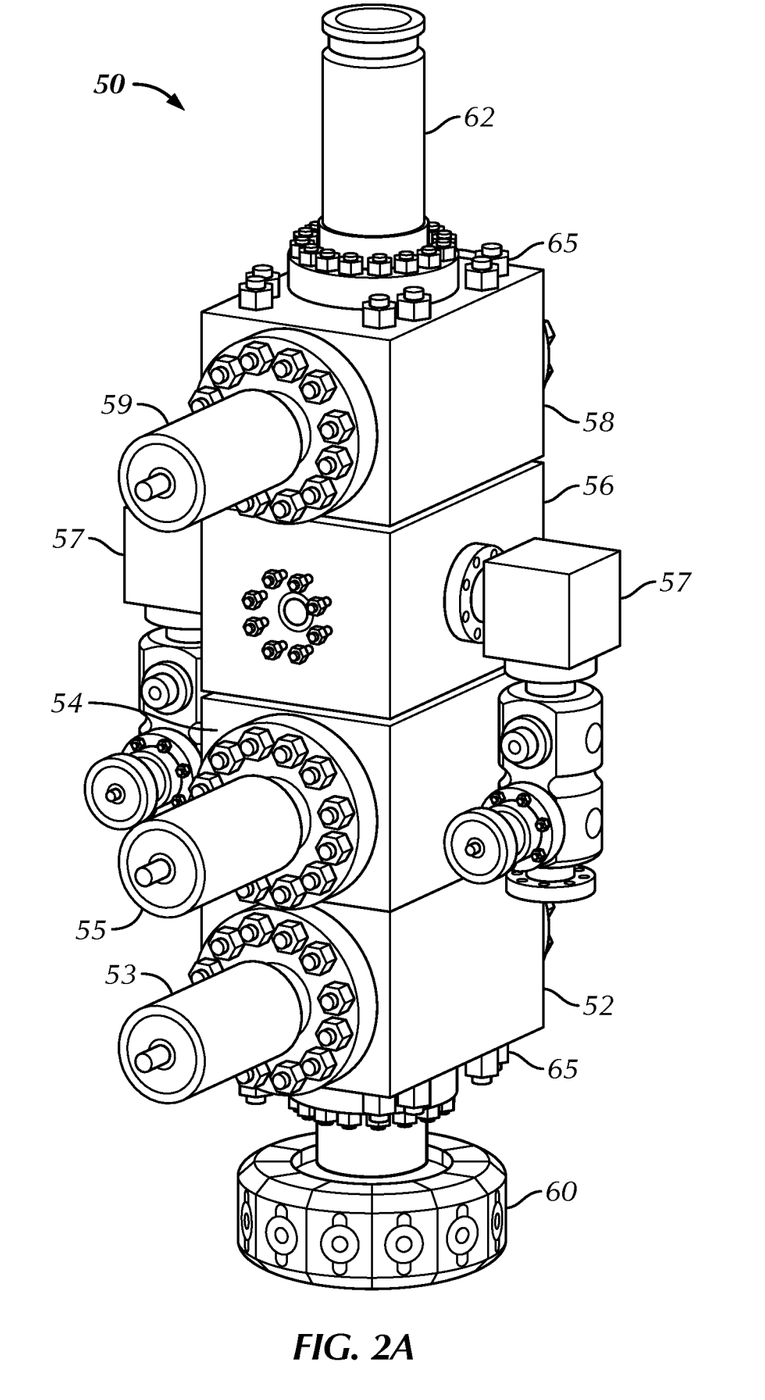

Referring now to FIG. 2A, a perspective view of a modular pre-packaged purpose built valve block according to embodiments herein is illustrated. As illustrated in FIG. 2A, the modular pre-packaged purpose built valve block 50 may include multiple blocks, including a lower master valve block 52, an upper master valve block 54, a cross-flow or swab valve block 56, and a swab valve block 58. A continuous flow path (internal) from a lower adapter 60 to an upper adapter 62 may be provided, where each of the adjacent flow blocks may be fluidly connected via seat pocket inserts (described further below). The blocks 52, 54, 56, 58 may each include cross bores intersecting with the contiguous flow path, in which valve elements 53, 55, 59 may be disposed, or which may be connected to other fluid connections, such as a cross-bore of the cross-flow block 56 fluidly connecting to plug valve wing blocks 57. The blocks 52, 54, 56, 58 may be assembled and maintained together using threaded posts 65. The retention system may include, for example, one or more threaded posts 65 extending through the two or more blocks of the modular valve block, and each of the two or more blocks may include through-holes aligned and configured to receive the threaded posts. Nuts or other means may be tightened (torqued) to compress and engage one or more of the sealing elements. It is further envisioned that the blocks of the modular pre-packaged purpose built valve block 50 may be compressed and held in place by strength arms, which may include vertical bars and horizontal bars connected via bolts. As noted above, the blocks may be fluidly connected via seat pocket inserts to provide a continuous flow path.

Figure 2B:
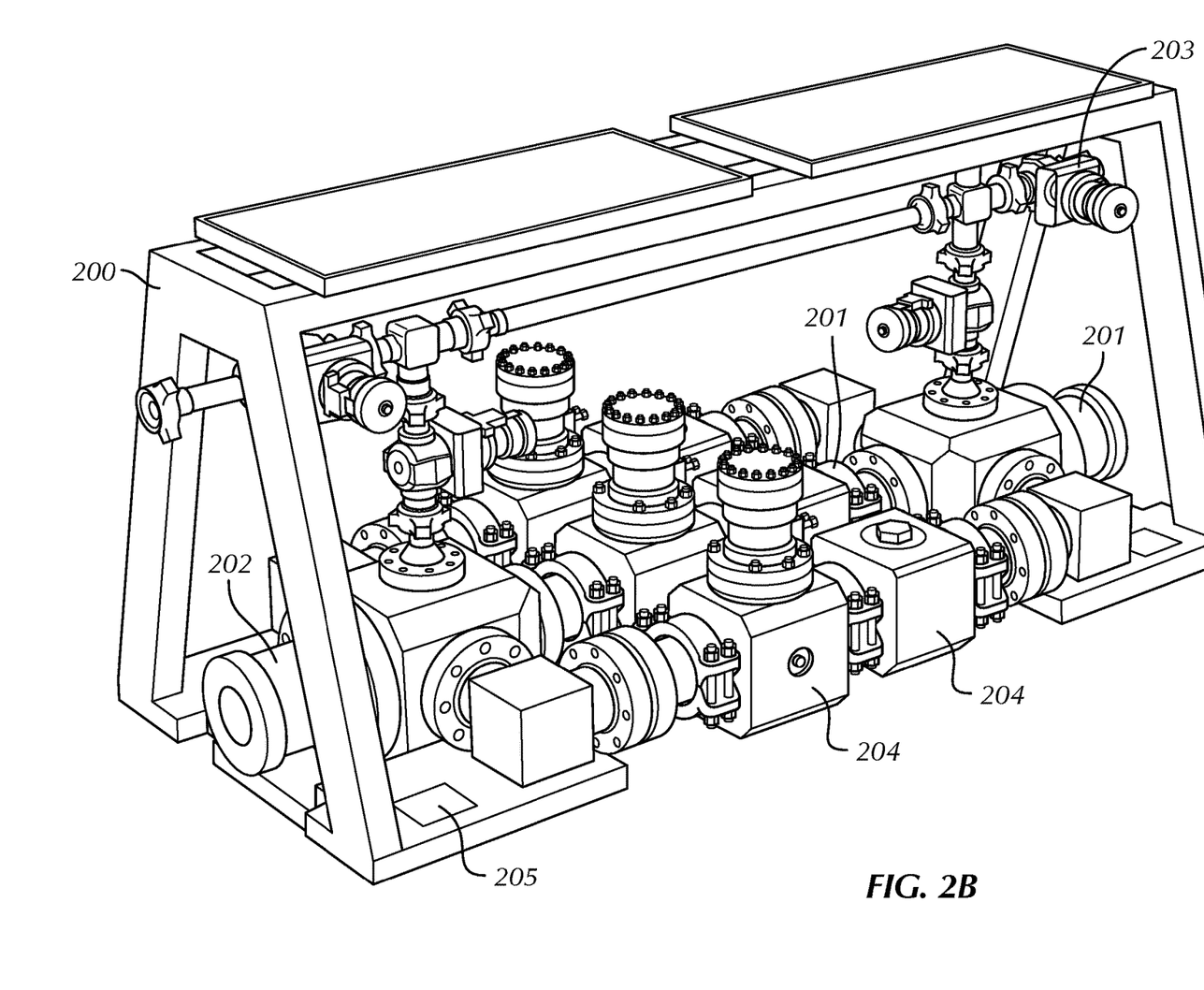

Referring now to FIG. 2B, another embodiment of a modular pre-packaged purpose built valve block assembly according to embodiments herein is illustrated, where like numerals represent like parts. The embodiment of FIG. 2B is similar to that of the embodiment of FIG. 2A. However, the modular pre-packaged purpose built valve block 50 may be disposed on a skid 200. Additionally, the modular pre-packaged purpose built valve block 50 may be a horizontal manifold having a main conduit 201 extending from an inlet 201 to an outlet 202. Further, a second inlet/outlet 203 may be fluidly coupled to main conduit 201. In some embodiments, one or more secondary fluid conduit blocks 204 may be fluidly coupled to main conduit 201. Also seen by FIG. 2B, the skid 200 may include a plurality of connection blocks 205 which may engage with a trailer or other surfaces at the well site. One skilled in the art will appreciate how the modular pre-packaged purpose built valve block 50 on the skid 200 may have various components and be used for hydraulic fracturing operations. In addition to the modular pre-packaged purpose built valve block 50 shown in FIGS. 2A and 2B, other modular pre-packaged purpose built valve block may be configured according to embodiments herein, such as wellheads, Christmas tree, blow-out preventers, fluid manifolds and conduits, pumps and injectors, and power units.

Figure 3A:
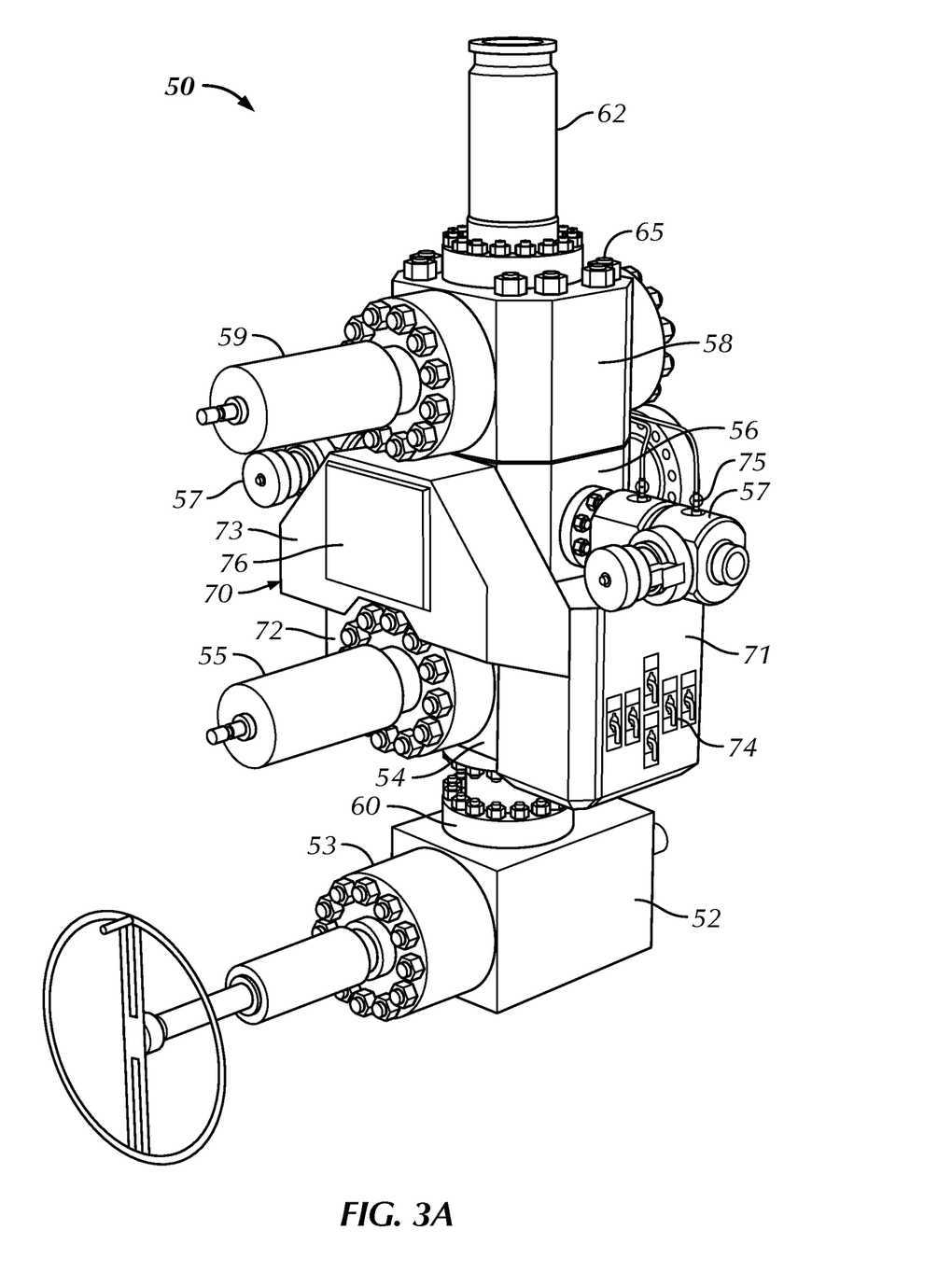
Figure 3B:
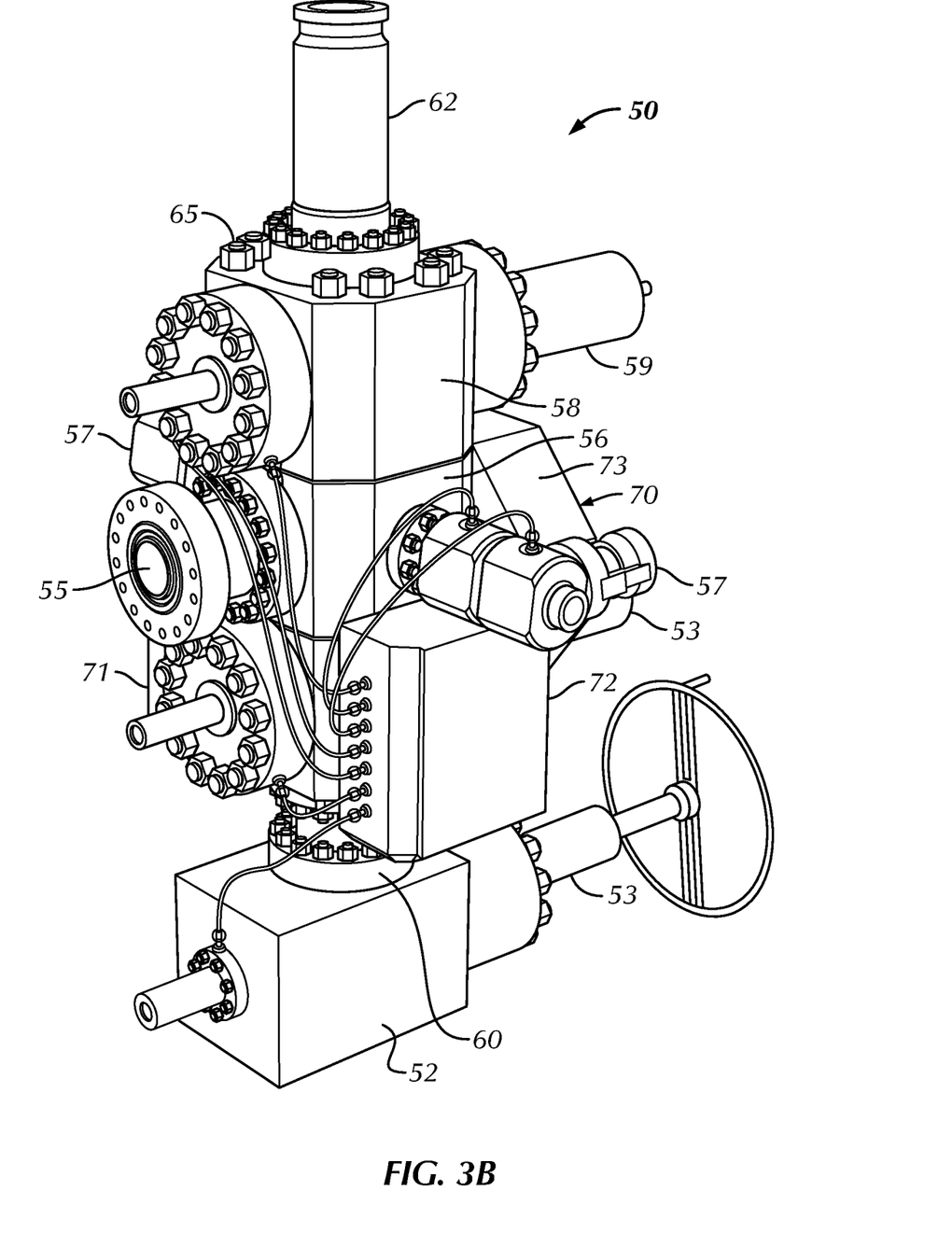

Referring now to FIGS. 3A and 3B, another embodiment of a modular pre-packaged purpose built valve block assembly according to embodiments herein is illustrated, where like numerals represent like parts. The embodiment of FIGS. 3A and 3B are similar to that of the embodiment of FIG. 2A. However, the modular pre-packaged purpose built valve block 50 may have the upper master valve block 54, the cross-flow or swab valve block 56, and the swab valve block 58 between the continuous flow path (internal) from the lower adapter 60 to the upper adapter 62. The lower adapter 60 may be coupled to the lower master valve block 52 at a well site.

In one or more embodiments, the modular pre-packaged purpose built valve block 50 may include a control wrap system 70 coupled to the two or more blocks (52, 54, 56, 58). The control wrap system 70 may include, for example, one or more control blocks (71, 72, 73). In a non-limiting example, a first control block 71 may include switches 74 for manually operating the modular pre-packaged purpose built valve block 50. The switches 74 may be hydraulic or electric. Additionally, a second control block 72 may be positioned on the modular pre-packaged purpose built valve block 50 opposite the first control block 71. The second control block 72 may include lines 75 connected to the various components of the modular pre-packaged purpose built valve block 50 to perform operations such as greasing or valve actuation. It is further envisioned that a third control block 73 may connect the first control block 71 and the second control block 72 together. The third control block 73 may include a control box 76 for automatically or manually operating the modular pre-packaged purpose built valve block 50.

Figure 4A:
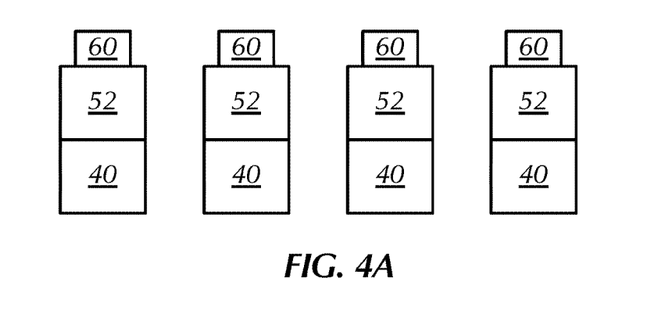
FIGS. 4A-4D are simplified block diagrams of example assemblies in accordance with one or more embodiments.
Figure 4B:
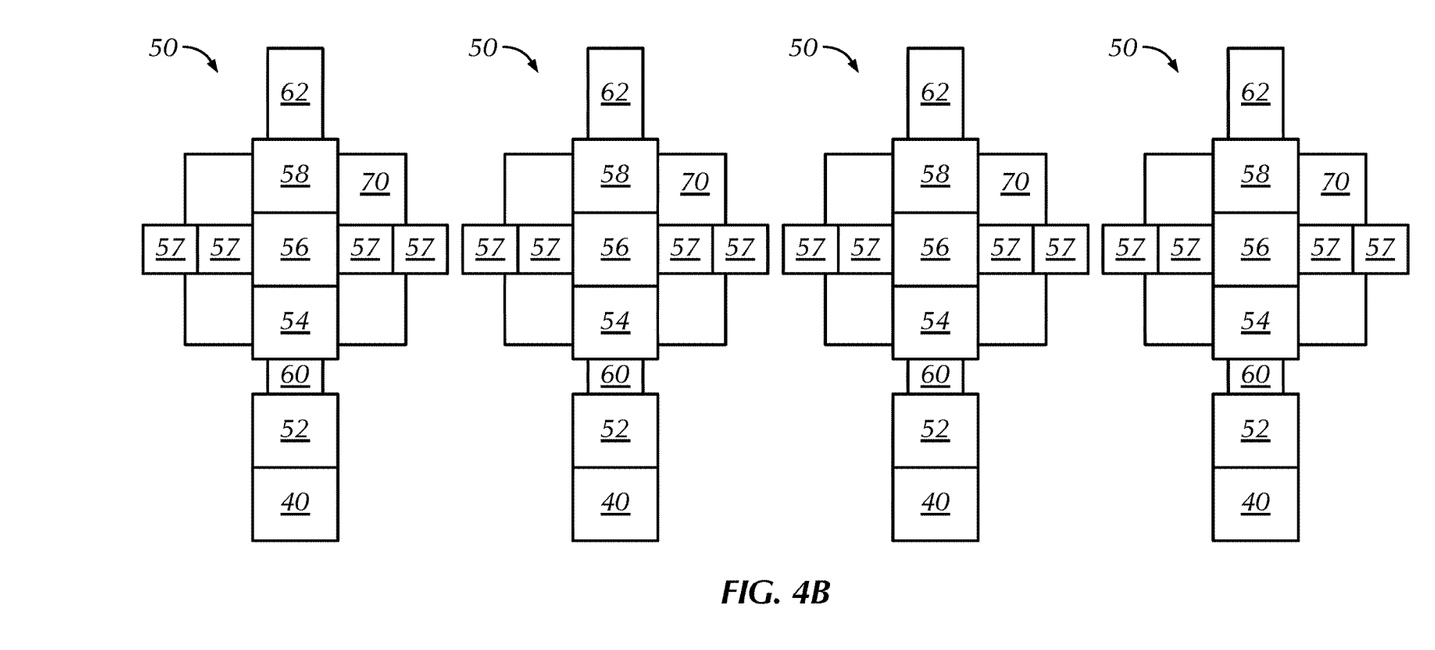
Figure 4C:
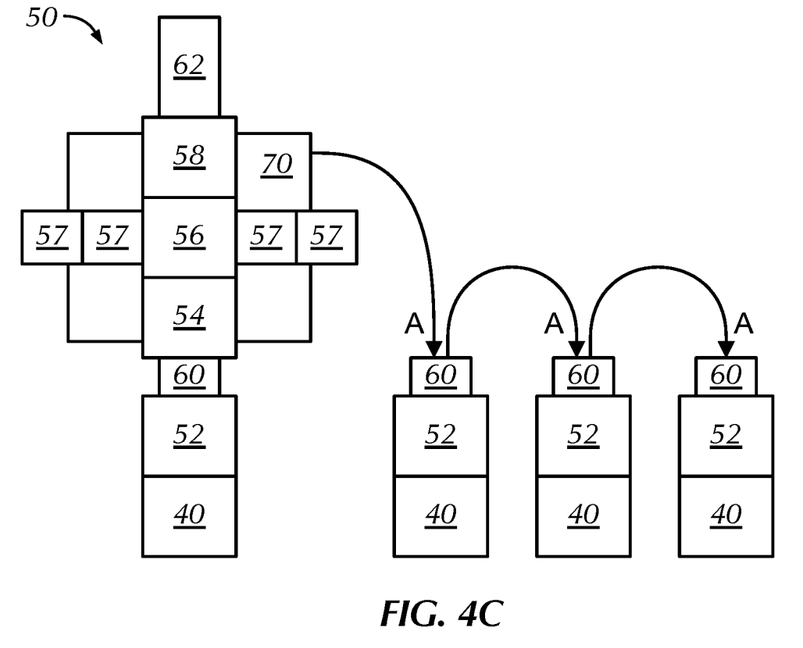
Figure 4D:
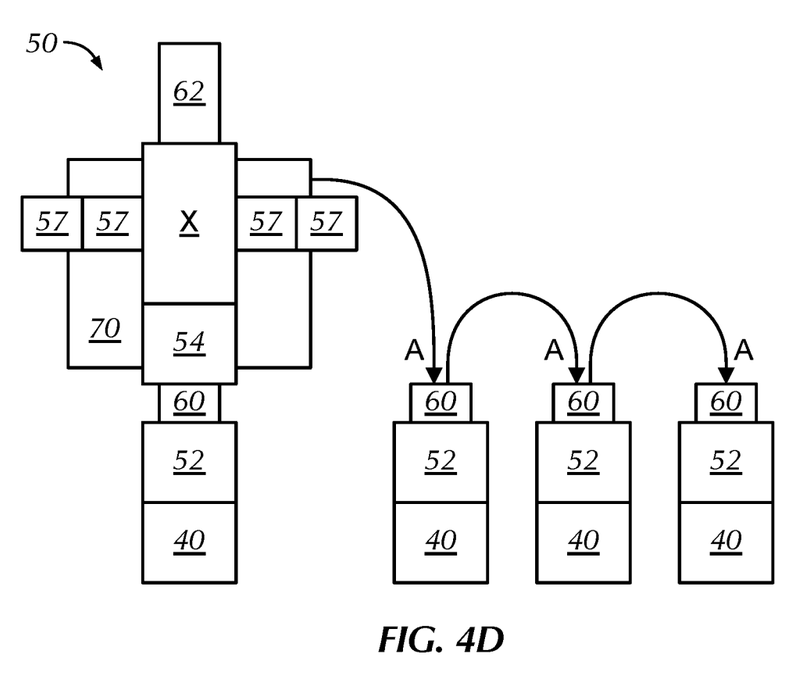

Now referring to FIGS. 4A-4D, in one or more embodiments, examples of deploying the modular pre-packaged purpose built valve block 50 are illustrated. Specifically, as illustrated in FIG. 4A, wellheads 40 may be provided at a rig site. In an initial prep mode, the lower master valve block 52 may be coupled to the wellheads 40 and the lower adapter 60 may be coupled to the lower master valve block 52. As shown in FIGS. 4B-4D, with the lower master valve block 52 and the lower adapter 60 installed, the modular pre-packaged purpose built valve block 50 may be deployed and coupled to the lower master valve block 52 via the lower adapter 60 and be fluidly connected to the wellheads 40. For example, in FIG. 4B, each wellhead 40 may have a corresponding modular pre-packaged purpose built valve block (50). In FIG. 4C, a single modular pre-packaged purpose built valve block (50) may be first deployed on one of the wellheads 40 and then moved in the direction of arrow A to another wellhead 40 based on an operational need. In a non-limiting example, a crane may be used to move the modular pre-packaged purpose built valve block (50) from one wellhead (40) to another wellhead (40). The embodiment of FIG. 4D is similar to that of the embodiment of FIG. 4C. However, the modular pre-packaged purpose built valve block 50 may have a slim configuration. In the slim configuration, the modular pre-packaged purpose built valve block 50 may include a single block X coupled to the upper master valve block 54 instead of the cross-flow or swab valve block 56 and the swab valve block 58. They single block X may be any type or combination of a valve block based on a specific operation for the intended deployment.

As shown FIGS. 2A-4D, in one or more embodiments, the modular pre-packaged purpose built valve block 50 may be configured for one type of application rather than conventional valve blocks that are built for multiple applications. By having the modular pre-packaged purpose built valve block 50 configured for one type of application, one skilled in the art will appreciate this opens up opportunity to improve performance specific to the one type of application, and then swap out the modular pre-packaged purpose built valve block 50 for another modular pre-packaged purpose built valve block that may be for a different application or operation. In a non-limiting example, the modular pre-packaged purpose built valve block (50) may be specific to a frac application. Once frac operations are completed, the frac specific modular pre-packaged purpose built valve block (50) may than be swapped out for a modular pre-packaged purpose built valve block (50) that is specific to a drill out application. One skilled in the art will appreciate how having application-specific modular pre-packaged purpose built valve blocks, service inspection intervals and valve performance monitoring may be performed at different times and individually based on the application, leading to redress savings. Advantageously, this may allow the drill out specific modular pre-packaged purpose built valve block to be moved from well to well, and go longer between service/redress intervals versus conventional multi-purpose blocks or a frac specific modular pre-packaged purpose built valve block that may experience more abuse.

Figure 5:
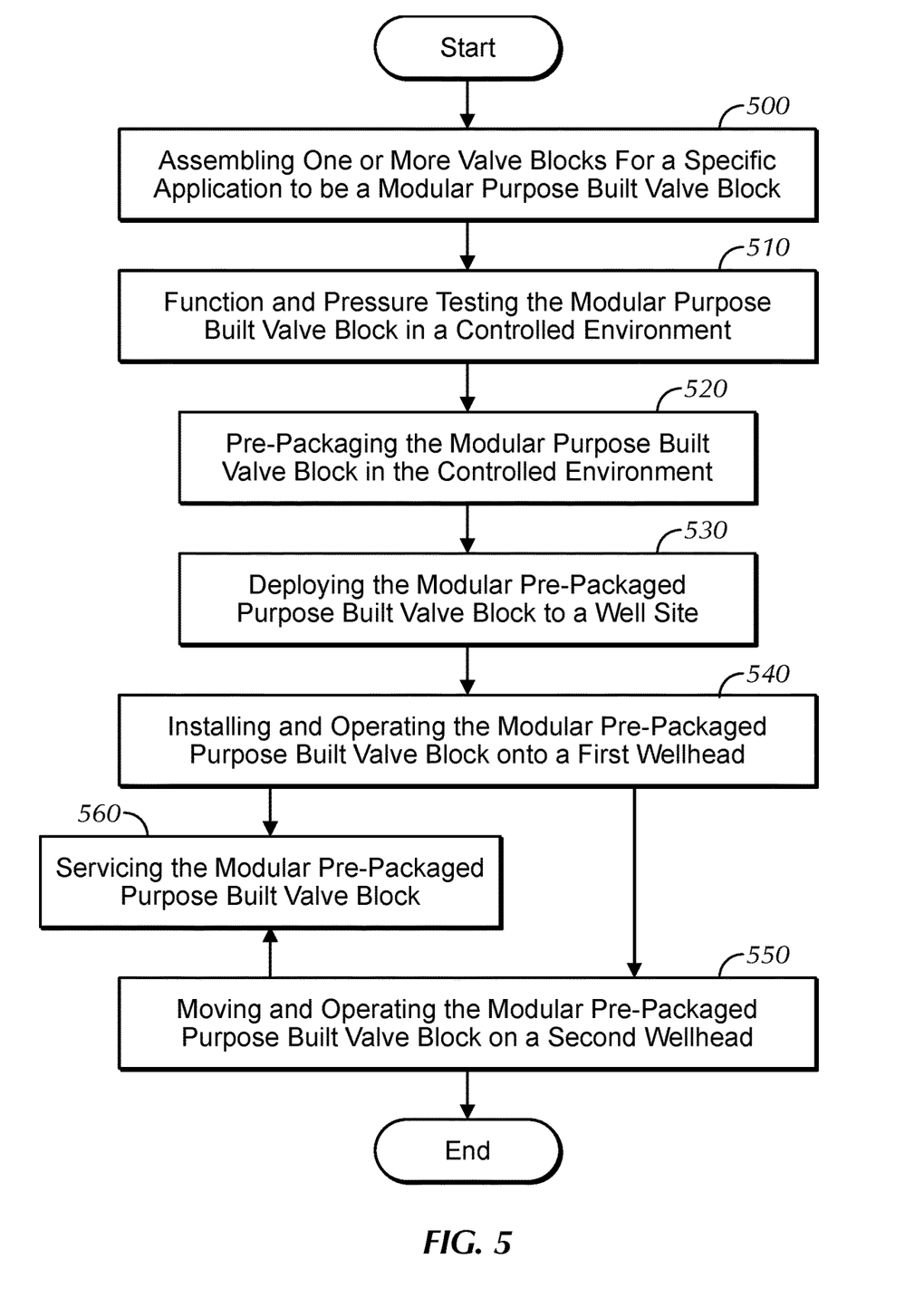
FIG. 5 shows a flow chart for assembling and using modular pre-packaged purpose built valve blocks in accordance with one or more embodiments.

Turning to FIG. 5, FIG. 5 shows a flowchart in accordance with one or more embodiments. Specifically, FIG. 5 describes a general method for assembling, testing, deploying, and using the modular pre-package purpose built valve block (50). One or more step in FIG. 5 may be performed using one or more modular pre-packaged purpose built valve blocks (50)) as described in FIGS. 2A-4D. While the various blocks in FIG. 5 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Block 500, one or more modular valve blocks for a specific application are assembled in accordance with one or more embodiments. The one or more modular valve blocks may be built and assembled based on an order received for the specific application to be performed at the well site. For example, in a controlled environment, a modular valve block is assembled by coupling one or more valve blocks together. Additionally, a configuration of the modular valve block is purpose built for the specific application in which it is to be used at a well site (frac operations, drill-out operations, production operations, workover operations, etc.). The method of assembly may also include assembling a retention system configured to retain the modular valve blocks in position. Further, a control wrap system may be coupled to the one or more valve blocks. In one embodiment, the control wrap system may correspond to a digital system. For example, the digital system may include a processor or controller with instruction to automatically monitor and operate the modular purpose built valve block.

In Block 510, the modular purpose built valve block is function and pressure tested within the controlled environment in accordance with one or more embodiments. For example, the modular purpose built valve block may be hydro-tested in a shop to function test seals and valves. The test performed in the shop may be completely automated via the digital system. Additionally, each seal and valve within the modular purpose built valve block may be individually tested for function and safety. Likewise, the control wrap system may also be tested to ensure that the modular purpose built valve block may operate in the field with little to no human intervention. It is further envisioned that the digital system may identify components, both at the controlled environment or in the field, of the modular purpose built valve block. Additionally, based on the identified components, the digital system may determine a type of function test to perform on the modular purpose built valve block.

In one or more embodiments, the function and pressure test of the modular purpose built valve block may be implemented by a computing system. Any combination of mobile, desktop, server, router, switch, embedded device, or other types of hardware may be used. For example, the computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. The computing system may be in communication or intergraded with the control wrap system. Further, the computing system may include one or more output devices, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s), non-persistent storage (604), and persistent storage. Many different types of computing systems exist, and the aforementioned input and output device(s) may take other forms.

In some embodiments, software instructions in the form of computer readable program code to perform and implement the function and pressure test of modular purpose built valve block may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure. It is further envisioned that software instructions may be stored in the control wrap system to operate the modular purpose built valve block in the field. For example, the software instructions may include instructions to automatically actuate valves within the modular purpose built valve block. Additionally, the instructions may further include steps to automatically pressurize seals within the modular purpose built valve block.

In Block 520, once the modular purpose built valve block is tested and ready, the modular purpose built valve block is pre-packaged before deployment into a well site in accordance with one or more embodiments. For example, the modular pre-packaged purpose built valve block is fully operational and standardized, within the controlled environment (i.e., a shop), to be used for the specific application at the well site.

In Block 530, the modular pre-packaged purpose built valve block is deployed to a well site in accordance with one or more embodiments. For example, the modular pre-packaged purpose built valve block is shipped to the well site location ready for use.

In the Block 540, the modular pre-packaged purpose built valve block is installed and operated onto a first wellhead at the rig site in accordance with one or more embodiments. For example, the modular pre-packaged purpose built valve block is fluidly coupled to the first wellhead. Based on different well site needs, the modular pre-packaged purpose built valve block is coupled to the first wellhead ready for operation (e.g., hydraulic fracturing or drill out) in the specific application for which the modular pre-packaged purpose built valve block was configured. In one or more embodiments, the modular pre-packaged purpose built valve block is automatically operated via the instructions on the digital system. In the Block 550, once the operations are completed, the modular pre-packaged purpose built valve block is moved to a second wellhead for further operations at the second wellhead. It is further envisioned that a second modular pre-packaged purpose built valve block, with a different specific application from the modular pre-packaged purpose built valve block, may be installed on the first wellhead to perform operations different from those previously done when using the first modular pre-packaged purpose built valve block.

In some embodiments, the modular pre-packaged purpose built valve block may be serviced and redressed in intervals. In Block 560, the modular pre-packaged purpose built valve block is service inspected in intervals at either the first wellhead and/or the second wellhead. It is further envisioned that the digital system may aid in service inspection and valve performance monitoring without human intervention. For example, the digital system may have pre-determined times or work rate at which to automatically perform an inspection of the modular pre-packaged purpose built valve block.

Conventional block blocks in the oil and gas industry are typically very large, heavy, and lack standardization and require customizing each valve block for each specific job. Further, conventional block blocks increase an amount of rig-up time and labor required, along with an improved skill set to sustain the field rig up of the conventional block blocks.

As described above, embodiments herein are directed toward a modular pre-packaged purpose built valve block. Advantageously, embodiments disclosed herein may provide for a valve block that is modular, compact, function tested before shipment and built for a specific application to operate at a well site. For example, embodiments herein may decrease installation time, minimize or eliminate human interaction with the valve block at the well site, and standardizing the valve block for a specific application. Further, the standardizing of the valve block according to embodiments herein may reduce fatigue on the valve block from non-specific application. Designs according to embodiments herein additionally may reduce the amount specialized workers needed to operate the valve block before and after installation.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method, comprising:
    assembling, in a controlled environment, a valve block to be modular and purpose built for a specific application, wherein the specific application is an operation to be performed at a well site, wherein assembling the modular purpose built valve block comprises:
        coupling two or more blocks together to form a body of the modular purpose built valve block,
        extending one or more threaded posts through through-holes in a housing of the two or more blocks to couple the two or more blocks on top of each other, and
        coupling a control wrap system to the body of the modular purpose built valve block, wherein control blocks of the control wrap system are coupled to a corresponding block of the modular purpose built valve block;
    function testing, in the controlled environment, the modular purpose built valve block;
    pre-packaging, in the controlled environment, the modular purpose built valve block to have a digital system of the control wrap system to operate and automate the modular purpose built valve block;
    deploying the modular pre-packaged purpose built valve block to the well site, wherein the modular pre-packaged purpose built valve block is fluidly coupled to a wellhead; and
    operating the modular pre-packaged purpose built valve block to perform the operation at the well site.

2. The method of claim 1, wherein the function testing comprises individually hydro-testing each valve within the modular pre-packaged purpose built valve block.

3. The method of claim 1, wherein coupling the control wrap system comprises positioning a first control block of the control blocks opposite a second control block of the control blocks, and connecting the first control block and the second control block together via a third control box of the control blocks.

4. The method of claim 3, wherein the first control block comprises switches for manually operating the modular pre-packaged purpose built valve block, the second control block comprises lines connected to the two or more blocks to perform greasing or valve actuation, and the third control block comprises a control box with the digital system for automatically or manually operating the modular pre-packaged purpose built valve block.

5. The method of claim 4, further comprising providing instructions on the digital system to automatically operate the modular pre-packaged purpose built valve block.

6. The method of claim 1, further comprising moving the modular pre-packaged purpose built valve block from the wellhead to a second wellhead.

7. The method of claim 6, further comprising performing the operation at the second wellhead.

8. The method of claim 6, further comprising fluidly coupling a second modular pre-packaged purpose built valve block to the wellhead to perform a second specific application different from the specific application of the modular pre-packaged purpose built valve block.

9. The method of claim 1, further comprising automatically inspecting, via the digital system, the modular pre-packaged purpose built valve block at the well site.

10. The method of claim 1, further comprising configuring the components of the modular pre-packaged purpose built valve block based on the specific application, wherein the specific application is for a hydraulic fracturing operation.

11. The method of claim 1, further comprising providing instructions on a non-transitory computer-readable medium, executable by a processor of the digital system on the modular pre-packaged purpose built valve block, the instructions comprising:
    performing the function testing on the modular pre-packaged purpose built valve block, wherein the performing comprises:
        automatically actuating valves within the modular pre-packaged purpose built valve block, and
        pressurizing seals within the modular pre-packaged purpose built valve block.

12. The method of claim 11, further comprising identifying, with the digital system, components of the modular pre-packaged purpose built valve block.

13. The method of claim 12, further comprising determining a type of the function test to perform based on the identified components.

14. The method of claim 11, further comprising programming the specific application of the modular pre-packaged purpose built valve block based on results of the function test.

15. The method of claim 14, the instructions further comprising functionality to control and operate the modular pre-packaged purpose built valve block.

16. A system, comprising:
    a valve block with a continuous flow path in at least two or more blocks, wherein the least two or more blocks is configured to connect to a wellhead, or pump fluids into a wellbore, or provide power to other equipment, or bleed off and discharge pressure, or isolate various flow paths;
    one or more threaded posts extending through through-holes in a housing of the two or more blocks to couple the two or more blocks on top of each other; and
    a control wrap system with least two or more control blocks, wherein each control block is coupled to a corresponding block, and the control wrap system comprises a digital system to operate and automate the valve block.

17. The system of claim 16, wherein the valve block is coupled to a hydraulic fracturing system at a well site.

18. The system of claim 17, wherein the valve block is programmed, via the digital system, for a specific application or operation to be performed at the well site.

19. A method, comprising:
  receiving an order for two or more valve blocks to perform a specific application, wherein the specific application is an operation to be performed at a well site;
  building the two or more valve blocks in a controlled environment, wherein the building comprises:
    assembling the two or more valve blocks to be modular and purpose built for the specific application;
    extending one or more threaded posts through through-holes in a housing of the two or more blocks to couple the two or more blocks on top of each other;
    coupling two or more control blocks of a control wrap system to the two or more modular purpose built valve blocks to be autonomous;
    function testing the two or more autonomous modular purpose built valve blocks to perform the specific application; and
    programing a digital system of the control wrap system to operate and automate the two or more autonomous modular purpose built valve blocks; and
  shipping the two or more autonomous modular purpose built valve blocks to the well site.

20. The method of claim 19, further comprising providing, via the digital system, pre-determined times at which to automatically perform an inspection of the two or more autonomous modular purpose built valve blocks.

* * * * *